United States Patent Office 3,071,336
Patented Jan. 1, 1963

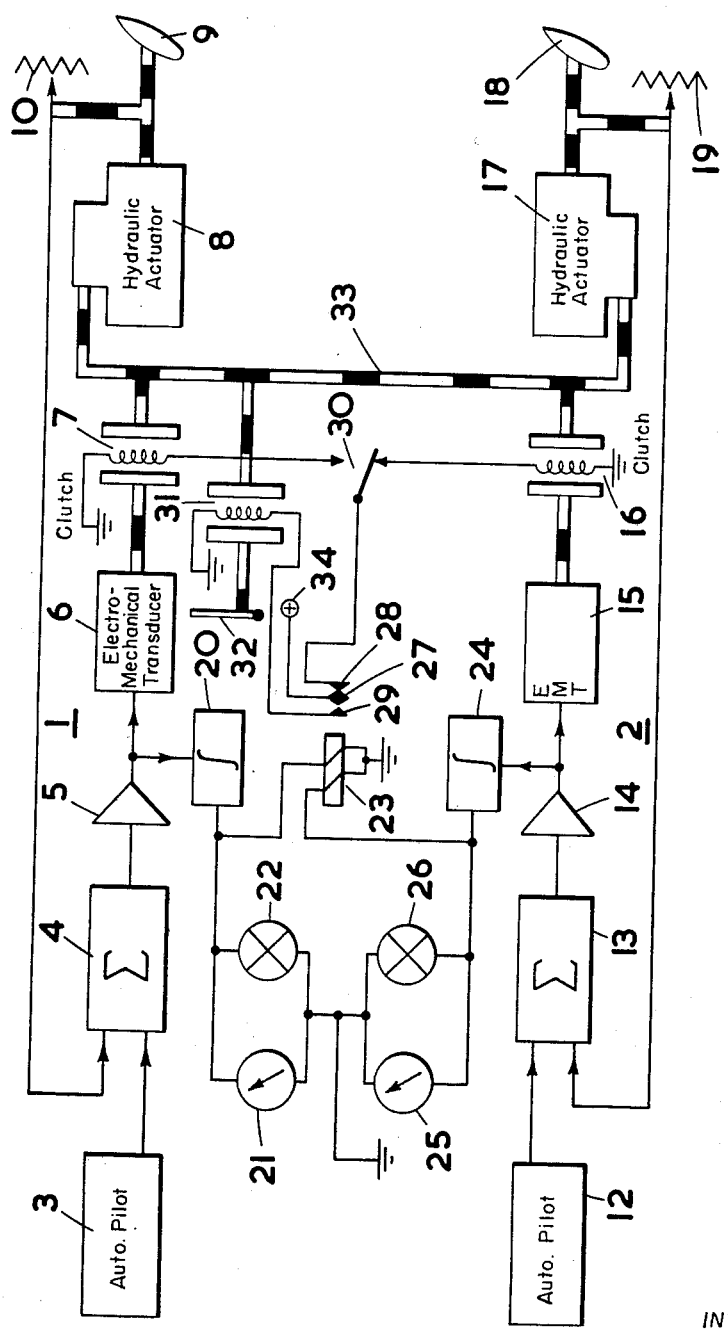

3,071,336
ACTUATING DEVICES FOR CONTROL SURFACES OF MOVING CRAFT
Kenneth Fearnside, Bredon, near Tewkesbury, England, assignor, by mesne assignments, to S. Smith & Sons (England) Ltd., London, England, a corporation of England
Filed Aug. 17, 1959, Ser. No. 834,162
Claims priority, application Great Britain Aug. 15, 1958
7 Claims. (Cl. 244—77)

The present invention relates to the provision of means for indicating malfunction of control systems for the automatic actuation of control surfaces of moving craft, in particular of aircraft.

Such apparatus has servo channels, each comprising means for generating a control surface movement demand signal, a feed-back generator producing a control surface movement signal in accordance with the actual movement of the control surface and a servo motor normally energised in accordance with the discrepancy between those signals to correct the discrepancy. The signals have any convenient nature. They may be for example electric voltages or mechanical displacements. Usually the discrepancy is amplified to provide a signal at a suitable level to control the servo motor.

For reasons of safety such apparatus may have more than one channel to actuate the control surface, or surfaces, or sections thereof controlling movement of the craft about any one of its three control axes (supposing it to be an aircraft). If there are more than two channels and a fault develops in one of them it is comparatively simple, at least in principle, to ascertain the faulty channel, as being that which differs substantially from the others. However, if there are only two channels a disagreement between them will be indicative of a fault, but will not show in which channel the fault lies. Thus the only safe course is to disconnect both channels, and then re-connect one of them. It is essential that it should be known prior to re-connection that the re-connected channel should not be capable of producing unsafe operation of the control surfaces, i.e. a run-away. It is accordingly the object of the present invention to provide means to indicate faults capable of causing dangerous control surface movements in a servo channel for the actuation of control surfaces of moving craft when the said channel is energised but not operative to actuate the surfaces.

According to the present invention we provide a control system for the automatic actuation of control surfaces of moving craft comprising a first servo channel, a first integrator comprising integrating means for producing an output signal proportional to the integral of an input signal, and first warning means connected to the output of the first integrator and operating when the said output exceeds some predetermined level, the first servo channel comprising generator means to provide a control surface movement demand signal, a servo motor adapted to position a control surface, generator means to produce a feedback signal in accordance with the actual movement of the control surface, means connected to the demand signal generator means and to the feedback generator means to produce a signal in accordance with discrepancy between the demand signal and the feedback signal, and energising means for the servo motor to which the discrepancy signal is applied and which in a first condition is operable to energise the servo motor in accordance with the discrepancy signal in a sense to correct the discrepancy and in a second condition is not operable, the discrepancy signal being also applied to the first integrator.

Thus, if the energising means is not operable (so that the channel is not effective to control the control surface) but the various components in the channel remain energised, and no manoeuvre demands are made upon the channel, so that the craft merely moves in its natural oscillating modes, if the channel is fault free the output of the integrator will, over any period which is long compared with the short period oscillating motion of the craft, be substantially zero unless there is some fault in the channel.

It will also of course be zero if the channel is "dead," but the re-connection of a dead channel can do no harm. It can thus be seen that, in a case where there are two channels, after automatic disconnection by reason of disagreement between the channels, it will be safe for the (human) pilot to re-engage either channel if the output of the integrator associated with it is below some appropriate datum value. If both channels are safe to engage, the pilot can ensure that he has not engaged a dead one by demanding some manoeuvre from the automatic control after engagement. If this demand is not followed the pilot will know that the channel is dead and he can engage the other one.

Similarly, if the control surface is moved by another channel the channel with its discrepancy signal not applied to its servo motor performing a stand-by or monitoring function, the integrator of that stand-by channel will indicate any disagreement between the channels, and thus a fault in one or other of the channels.

A control system for the automatic actuation of an aircraft control surface (e.g. an elevator) divided into two similar sections, the system embodying the features of the present invention will now be described with reference to the accompanying drawing which shows the apparatus in schematic form.

Two similar channels are indicated generally at 1 and 2 respectively. Channel 1 comprises an auto pilot demand signal source 3, whose output is applied to an input of a summing device 4. The output of the summing device is applied to an amplifier 5 whose output is, in turn, applied to an electro-mechanical transducer 6. This is connected through an electrically-energised clutch 7 to the input of a hydraulic actuator 8 which is coupled to one section 9 of the aircraft control surface. A pick-off device 10 is also coupled to section 9, and the feed-back signal produced by the device is applied to a further input of summing device 4.

Channel 2 is identical with channel 1 comprising a further auto pilot demand signal source 12, a summing device 13, an amplifier 14, an electro-mechanical transducer 15, an electrically-energised clutch 16, a hydraulic actuator 17, a second section 18 of the aircraft control surface of which the section 9 constitutes a first section, and a pick-off device 19. All the elements 12–17 and 19 of channel 2 are identical with the corresponding elements 3–8 and 10 of channel 1.

The output of amplifier 5 is additionally applied to an integrator 20 whose output is, in turn, applied to an indicator 21, a warning device 2, and one section of a two-part winding of a relay 23. The output of amplifier 14 is also similarly applied to an integrator 24 whose output is, in turn, applied to an indicator 25, a warning device 26, and the other section of the winding of relay 23. This relay has a moving contact 27 co-operating in its de-energised condition with a fixed contact 28, and in its energised condition with a fixed contact 29. Contact 27 may be locked manually in engagement with either contact 28 or contact 29. Contact 27 is connected to an electric supply terminal 34, contact 28 through a change-over switch 30 to either the energising winding of clutch 7 or to that of clutch 16, and contact 29 to the energising winding of a further electrically-energised clutch 31. Clutch 31 is connected between a manual control member 32 and a mechanical link 33 which, in turn, is connected between the output members of clutches 7 and 16.

The identical auto pilot demand signal sources 3 and 12 are of a conventional kind comprising gyro compasses etc. They are responsive to aircraft attitude and rate of change of attitude.

The auto pilot demand signal sources 3 and 12 normally produce identical control surface movement demand signals. The pick-off devices 10 and 19 produce feed-backs in accordance with the actual movement of the sections of the control surface. The output from summing devices 4 and 13 is in accordance with the discrepancy between these signals, and the arrangement is such that the hydraulic actuators 8 and 17 are energised in a sense to correct the discrepancy.

When the output from either integrator 20 or 24 exceeds a pre-set magnitude (in either the negative or the positive sense) the appropriate warning device is operated and relay contact 27 engages contact 29, energising clutch 31 and de-energising whichever of clutches 7 and 16 was previously energised.

Assuming that switch 30 is such that clutch 16 is connected to contact 28, then when the relay 23 is de-energised the output of transducer 15 is applied to both hydraulic actuators 17 and 8. The output of transducer 6 is then not applied to either actuator. In this condition, both control surface sections 9 and 18 are being driven by channel 2 and the relevant parts of channel 1 act as a monitor. A fault will lead to a sustained discrepancy signal appearing at the output of amplifier 5 sooner or later, depending upon the particular fault, and cause the output of integrator 20 to exceed a predetermined value. So long as both channels are in agreement, the movement of control surface section 9 under the control of channel 2 will be substantially the same as would have occurred if that section had been controlled by channel 1 so the output of integrator 20 will remain within the pre-set limits. If there is a discrepancy between the channels, indicative of a fault in one or other of them, the warning device 22 will operate and relay 23 be energised causing clutch 16 to be de-energised and clutch 31 to be energised. Both actuators are then under manual control through member 32. The pilot will then place the signal sources 3 and 12 in a condition such that no demand for a manoeuvre from a straight and level course is generated, and examine the outputs of integrators 20 and 24 as shown on indicators 21 and 25 respectively. If one is outside the pre-set limits, the other channel is clearly the fault free one, and is re-engaged by manually locking the contact 27 in contact with contact 28 of relay 23 and setting switch 30 to energise the clutch of the fault-free channel. If both are within the pre-set limits this will indicate that, although one channel is faulty it does not have a fault such that it is capable of producing dangerous control surface movement. Either channel is, therefore, re-engaged (by appropriate setting of relay 23), and the pilot makes some appropriate manoeuvre demand. If the demand is followed it is known that the channel engaged is the fault free one, whereas if it is not followed the other channel is the fault free one, and that is engaged by throwing over switch 30.

It will be appreciated that when the clutch of a channel is engaged, the integrator associated with the channel will not indicate a fault unless it occurs in the loop of the channel comprising the summing device, the amplifier, the transducer, the clutch, the actuator, and the pick-off. For example, warning device 26 would not operate if been engaged, a fault were to arise in signal source 12 and the control surface section 18 correctly followed the erroneous signal applied to channel 2 from the signal source 12. Again, it would not operate in response to a fault in channel 1. As warning device 22 is supplied with a signal representing the difference between the position of the control surface 9, as determined by the operation of channel 2 and the signals derived from source 3, it will operate in response to most faulty conditions arising in either channel 1 or 2. Device 26 provides additional warning.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A control system for the automatic actuation of control surfaces of moving craft comprising a first servo channel, a first integrator having integrating means for producing an output signal proportional to the integral of an input signal, first warning means connected to the output of the first integrator and operating when the said output exceeds some predetermined level, the first servo channel comprising generator means to provide a control surface movement demand signal, a servo motor adapted to position a control surface, generator means to produce a feed-back signal in accordance with the actual movement of the control surface, means connected to the demand signal generator means and to the feed-back generator means to produce a signal in accordance with discrepancy between the demand signal and the feed-back signal, and energising means for the servo motor to which the discrepancy signal is applied and which in a first condition is operable to energise the servo motor in accordance with the discrepancy signal in a sense to correct the discrepancy and in a second condition is, not operable, the discrepancy signal being also applied to the first integrator, a second servo channel for producing independently a signal equivalent to that produced by the first channel, and linking means coupling the energizing means of the first and second channels such that when the energizing means of one of said channels is in a first condition, and that of the other channel is in a second condition, both servo motors are energized in accordance with the discrepancy signal of said one channel.

2. A control system for the automatic actuation of a control surface of a movable craft, the control surface being divided into first and second parts and the system comprising first and second servo channels having respectively first and second servo motors for positioning the first and second parts respectively of the control surface and each having an input member adapted to be mechanically driven to actuate the motor; each channel further comprising signal generating means for providing a control surface movement demand signal, feed-back signal generator means for producing a feed-back signal in dependence upon the movement of the respective one of the first and second parts of the control surface, means coupled to the demand signal generator and the feed-back signal generator for producing a signal in accordance with any discrepancy between the demand signal and the feed-back signal, energizing means having a mechanical output member and having first and second conditions of operation, the discrepancy signal being applied to said energizing means and said energizing means in the first condition being operable to actuate its output member in accordance with the discrepancy signal and in the second condition being non-operable, coupling means coupling the output member of the energizing means to the input member of the respective one of the first and second servo motors to actuate the motor in accordance with the discrepancy signal, the sense of the coupling being such that the servo motor positions the control surface part in a sense to reduce any discrepancy signal towards zero; linking means coupling the input members of the first and second servo motors so that they operate in common; first and second integrators each having an input and an output and each adapted to produce a signal at its output representing the integral with respect to time of a signal applied to its input; means for applying the first and second discrepancy signals respectively to the inputs of the first and second integrators; and first and second warning means each coupled to the output of the respective one of the first and second integrators and operating when the output signal exceeds some predetermined level.

3. A control system according to claim 2, in which the energizing means of the first and second servo channels are jointly controlled by control means having first and second conditions of operation in the first of which the first servo channel energizing means is placed in its first condition and the second channel energizing means is placed in its second condition and in the second of which the second channel energizing means is placed in its first condition and the first channel energizing means is placed in its second condition.

4. A control system according to claim 2, in which each energizing means comprises a motor and a two condition clutch connected between the output of the motor and the output member of the energizing means, the clutch in the first condition of operation of the energizing means coupling the motor to the output member and in the second condition of operation of the energizing means being inoperative so that the output member is not coupled to the motor.

5. A control system according to claim 4, said clutches being electrically operated clutches and control means for controlling the conditions of operation of the energizing means comprising a change-over switch for energizing a selected one of the electrically operated clutches.

6. A control system according to claim 5, an electric relay having a contact connected in the circuit of said change-over switch, the relay being controlled by the outputs of the first and second integrators to open said circuit if the output signal of either integrator exceeds said predetermined value.

7. A control system according to claim 6, a third electrically operated clutch and a manual control member, said third clutch when energized serving to couple the manual control member to said linking member and in which said contact is a change-over contact arranged so that on opening of the said circuit of the change-over switch it closes a circuit for energizing said third clutch.

References Cited in the file of this patent
UNITED STATES PATENTS

| | | |
|---|---|---|
| 2,665,086 | Moog et al. | June 5, 1954 |
| 2,673,314 | MacCallum | Mar. 23, 1954 |
| 2,773,252 | Noxon | Dec. 4, 1956 |
| 2,859,005 | Owen et al. | Nov. 4, 1958 |
| 2,970,443 | Springham | Feb. 7, 1961 |